(12) United States Patent
Harris et al.

(10) Patent No.: US 7,386,527 B2
(45) Date of Patent: Jun. 10, 2008

(54) EFFECTIVE MULTI-CLASS SUPPORT VECTOR MACHINE CLASSIFICATION

(75) Inventors: Christopher K. Harris, San Diego, CA (US); Mauritius A. R. Schmidtler, Escondido, CA (US)

(73) Assignee: Kofax, Inc., Irvine, CA (US)

( * ) Notice: Subject to any disclaimer, the term of this patent is extended or adjusted under 35 U.S.C. 154(b) by 767 days.

(21) Appl. No.: 10/412,163

(22) Filed: Apr. 10, 2003

(65) Prior Publication Data

US 2004/0111453 A1 Jun. 10, 2004

Related U.S. Application Data

(60) Provisional application No. 60/431,299, filed on Dec. 6, 2002.

(51) Int. Cl.
*G06F 17/00* (2006.01)
*G06F 15/18* (2006.01)
*G06N 7/00* (2006.01)
*G06N 7/08* (2006.01)
*G06N 5/00* (2006.01)

(52) U.S. Cl. ............................. 706/59; 706/12; 706/45

(58) Field of Classification Search ................. 706/45, 706/12, 20, 59; 382/159, 184, 224
See application file for complete search history.

(56) References Cited

U.S. PATENT DOCUMENTS 6,192,360 B1 2/2001 Dumais et al.
6,327,581 B1* 12/2001 Platt .............................. 706/12
6,789,069 B1 9/2004 Barnhill et al.
2005/0228591 A1* 10/2005 Hur et al. ..................... 702/19

OTHER PUBLICATIONS

Campbell et. al. "Machine learning strategies for complex tasks" Proceedings of First IEEE-RAS International Conference on Humanoid Robots, Springer Verlag, Cambridge, 2000.*

(Continued)

*Primary Examiner*—David Vincent
*Assistant Examiner*—Benjamin Buss
(74) *Attorney, Agent, or Firm*—Zilka-Kotab, PC

(57) ABSTRACT

An improved method of classifying examples into multiple categories using a binary support vector machine (SVM) algorithm. In one preferred embodiment, the method includes the following steps: storing a plurality of user-defined categories in a memory of a computer; analyzing a plurality of training examples for each category so as to identify one or more features associated with each category; calculating at least one feature vector for each of the examples; transforming each of the at least one feature vectors so as reflect information about all of the training examples; and building a SVM classifier for each one of the plurality of categories, wherein the process of building a SVM classifier further includes: assigning each of the examples in a first category to a first class and all other examples belonging to other categories to a second class, wherein if any one of the examples belongs to another category as well as the first category, such examples are assigned to the first class only; optimizing at least one tunable parameter of a SVM classifier for the first category, wherein the SVM classifier is trained using the first and second classes; and optimizing a function that converts the output of the binary SVM classifier into a probability of category membership.

29 Claims, 7 Drawing Sheets

OTHER PUBLICATIONS

Matalas et. al. "An edge detection technique using the facet model and parameterized relaxation labeling" IEEE Transactions Pattern Analysis and Machine Intelligence vol. 19 Issue 4. pp. 328-341. Apr. 1997.☐☐☐☐.*

Bennett et. al. "A Support Vector Machine approach to decision trees" IEEE 1998.*

Schölkopf. "The Kernel Trick for Distances" Technical Report MSR-TR-2000-51. Microsoft Research. May 2000.*

Guo et. al. "Face recognition by Support Vector Machines" Proc. of the International Conferences on Automatic Face and Gesture Recognitionz, 196-201, 2000.*

Joachims. "Estimating the generalization performance of a SVM efficiently" Proceedings of ICML-00, 17th International Conference on Machine Learning. Morgan Kaufmann Publishers, San Francisco, US. pp. 431-438, 2000.*

Sollich. "Bayesian methods for Support Vector Machines: evidence and predictive class probabilities" Machine Learning, 46, 21-52. Jan. 2002.*

Lee et. al. "Multicategory Support Vector Machines, theory, and application to the classification of microarray data and satellite radiance data" Technical report No. 1064. University of Wisconsin. Sep. 2002.*

Liu et. al. "Boosting to correct inductive bias in text classification" CIKM'02, ACM. Nov. 4-9, 2002.*

Lai. "Conversational News Agent" Thesis, The University of New South Wales. Nov. 2002.*

Ayat,N.E. et. al. "Empirical error based optimization of SVM kernels: Application to digit image recognition" Aug. 2002.*

Davy,M. et. al. "Improved optimization of time-frequency-based signal classifiers" Feb. 2001.☐☐.*

"The American Heritage College Dictionary; Fourth Edition"—definition of "relationship". 2004.*

Rennie,J.D. et. al. "Improving Multiclass Text Classification with the Support Vector Machine". Oct. 2001.*

Kolcz,A. et. al. "Summarization as Feature Selection for Text Categorization". CIKM'01. Nov. 2001.*

Cristianini,N. et. al. "An Introduction to Support Vector Machines and other kernel-based learning methods" pp. 8-11, 26-41, 92-101, 124-129. 2000.*

Kindermann,J. et. al. "Error Correcting Codes with Optimized Kullback-Leibler Distances for Text Categorization". PKDD 2001. Springer-Verlag. 2001.*

Russell,S. et. al. "Artificial Intelligence: A Modern Approach; Second Edition"—(§20.6) pp. 749-752. 2003.*

Platt, et al. "Large Margin DAGs for Multiclass Classification" Advances in Neural Information Processing Systems 12, pp. 547-553, MIT Press. 2000.*

Drucker,H. et al. "Support Vector Machines for Spam Categorization" IEEE. Sep. 1999.*

Weston, J. et al. "Support Vector Machines for Multi-Class Pattern Recognition" Proceedings of the Seventh European Symposium On Artificial Neural Networks. 1999.*

Fragoudis,D. et al. "Integrating Feature and Instance Selection for Text Classification" SIGKDD'02. ACM. Jul. 2002.*

Allwein, E. et al., "Reducing Multiclass to Binary: A Unifying Approach for Margin Classifiers". Proceedings of the 17th International Conference on Machine Learning (2000) pp. 113-141.

Bishop, C., M., Neural Networks for Pattern Recognition Oxford University Press Inc., New York (1995) pp. 27, 77-85, 230-247, 295-300 and 343-345.

Bredensteiner, E.J. & Bennett, K.P., "Multicategory Classification by Support Vector Machines" Computational Optimization and Applications (1999).

Dietterich, T. G. et al, "Solving Multiclass Learning Problems via Error-Correcting Output Codes" Journal of Artificial Intelligence Research 2:263-286 (1995).

Dumais, S. et al., "Inductive learning algorithms and representations for text categorization" In Proceedings of the ACM-CIKM98, Nov. 1998, 148-155 (1998).

Guermeur, Y., et al., A new multi-class SVM based on a uniform convergence result IJCNN, Como, Italy (2000).

Hearst, M. et al., "Trends and Controversies—Support Vector Machines" IEEE Intelligent Systems 13:(4) 18-28 (1998).

Hsu, C.-W. & Lin, C.-J., "A Comparison on Methods for Multi-class Support Vector Machines" Journal of Artificial Societies & Social Simulation 4(2) (2000).

Joachims, T., "Making Large Scale SVM Learning Practical" Advances in Kernel Methods—Support Vector Learning. MIT Press (1999).

Joachims, T., Text Categorization with Support Vector Machines: Learning with Many Relevant Features (1997).

Keerthi, S. et al., "Improvements to Platt's SMO Algorithm for SVM Classifier Design" (1999).

Mayoraz, E. & Alpaydin, E., Support Vector Machines for Multiclass Classification, IWANN, Alicante, Spain (1999).

Moreira; M. & Mayoraz, E., "Improved Pairwise Coupling Classification with Correcting Classifiers'", IDIAP-RR 97-09 (1997).

Morik, K. et al., "Combining statistical learning with a knowledge-based approach—A case study in intensive care monitoring" In Proceedings of the International Conference on Machine Learning, pp. 268-277 (1999).

Platt, J. C. et al., "Large Margin DAGs for Multiclass Classification" Advances in Neural Information Processing Systems 12:547-553 (2000).

Platt, J. C., "Fast Training of Support Vector Machines Using Sequential Minimal Optimization" Advances in Kernel Methods—Support Vector Learning (1999) pp. 41-65.

Platt, J. C., "Probabilistic Outputs for Support Vector Machines and Comparisons to Regularized Likelihood Methods" Advances in Large Margin Classifiers, MIT Press (1999).

Press, W. H., et al., Numerical Recipes in C++: The Art of Scientific Computing 2nd Edition, Cambridge University (2002) pp. 413-417.

Price, D., et al., "Pairwise Neural Network Classifiers with Probabilistic Outputs" Neural Information Processing Systems vol. 7 (1994).

Richard, M.D. and R. P. Lippmann, "Neural network classifiers estimate Bayesian a-posteriori probabilities" Neural Computation 3 (4):461-483 (1991).

Schütz et al, "A Comparison of Classifiers and Document Representations for the Routing Problem" Xerox Palo Alto Research Center, no date.

Sollich, P., "Probabilistic methods for Support Vector Machines" Advances in Neural Information Processing Systems 12:349-355 (2000).

Vapnik, V., "Statistics for Engineering and Information Science" Springer-Verlag New York, Inc. (2000) pp. 190-191.

Weston, J. & Watkins, C., Multi-class Support Vector Machines. CSD-TR-98-04, Royal Holloway, University of London, Egham, UK, (1998).

Zadrozny, B. et al., "Transforming classifier scores into accurate multiclass probability estimates" Proceedings of the Eighth International Conference on Knowledge Discovery and Data Mining (KDD'02) 2002.

Zadrozny, B., "Reducing Multiclass to Binary by Coupling Probability Estimates" Neural Information Processing Systems (2001).

Angulo, C. & Catala, A., 2000, A multi-class Support Vector Machine, ECML, Barcelona, Spain, p. 34-35 only.

International Search Report, International Application No. PCT/US03/35117, mailed Aug. 26, 2005, 1 page.

Office Action from European application No. 03768631.8 mailed on Jun. 25, 2007.

International Search Report from related European application No. 03768631.8 mailed on Feb. 9, 2007.

International Search Report from related European application No. 03768631.8 mailed on Mar. 26, 2007.

* cited by examiner

EFFECTIVE MULTI-CLASS SUPPORT VECTOR MACHINE CLASSIFICATION

CROSS-REFERENCE TO RELATED APPLICATIONS

The present application claims the benefit of priority under 35 U.S.C. § 119(e) to U.S. Provisional Patent Application Ser. No. 60/431,299 entitled "EFFECTIVE MULTI-CLASS SVM CLASSIFICATION," filed on Dec. 6, 2002, the entirety of which is incorporated by reference herein.

REFERENCE TO AN APPENDIX

Attached hereto as Appendix 1 is a table containing a list of reference documents, which are incorporated into the present specification in their entireties. Each reference document is referred to herein by its reference name (e.g., "Platt1") as indicated in the table of Appendix 1.

Attached as Appendix 2 is example pseudo-code for optimizing the parameters of a binomial distribution.

BACKGROUND OF THE INVENTION

1. Field of the Invention

The present invention relates to a system and method for effectively using a Support Vector Machine (SVM) to perform classification into multiple categories. In particular, the present invention relates to an improved system and method for applying SVM multi-classification techniques to computationally solve real-world problems.

2. Description of the Related Art

Multi-class classification problems pose a variety of issues, and applying SVMs in particular to multi-class classification problems presents many difficulties. The original "hard margin" algorithm is designed to determine a single hyperplane between two classes, known as the "maximum margin hyperplane." However, this algorithm does not efficiently and reliably define such hyperplanes if the classification problem includes training data with overlapping distributions, making it unsuitable for many real-world problems. The "soft margin" algorithm was later developed to lift this restriction, but this introduced a new problem. The soft margin algorithm contains a "user-definable" parameter. This parameter, known as the "cost factor," must be set outside of the SVM training algorithm in order to provide the algorithm with a correct tradeoff between memorization and generalization. The concept of a cost factor is not unique to SVM classification problems but, rather, is a more general concept related to pattern recognition machine learning. In the context of SVM classification, determining or calculating the cost factor typically requires more information than would otherwise be necessary to train a maximum margin hyperplane.

Prior art methods and systems have provided some minor improvements and modifications to the SVM algorithms to extend these algorithms to the multi-class case. However, the multi-class algorithms known to date are more computationally intensive than even the soft margin formulation, discussed above. Therefore, much work remains to be done to make these multi-class algorithms more computationally manageable. Additionally, there has not been much study on the theoretical properties of these multi-class algorithms, which raises some doubts as to their accuracy and reliability. For example, the generalization properties or asymptotic behavior modeled by the multi-class algorithms have not been studied and verified to the same degree as the original hard-margin and soft-margin SVM algorithms.

Common alternatives exist where multi-class decisions are subdivided into many binary problems. For example, a single (binary) SVM classifier is used for each two class problem then the results are combined back together to make a final decision. There are many algorithms known to those skilled in the art for doing this combination—two of the most popular are known as the "one vs. rest" and the "all pairs" approaches. The "one vs. rest" approach involves using a classifier to separate every category from all the other categories. The idea is to generate a set of SVMs that indicate class membership individually. The problem of resolving multiple category classification is a bit ambiguous but there are a variety of tie breaking schemes that are known. Similarly, the "all pairs" approach uses an SVM for every pair of classes, and lets every SVM vote to determine the final destination of a new item being classified. There are also various voting schemes known to those of ordinary skill in the art. See, e.g. Allwein1, Bishop1, Dietterich1, Platt3, Zadrozny2.

The output of an SVM classifier is a "score" with little value outside of the SVM compared to a true probability. A positive score means the SVM assigns the new example to one class, and a negative score indicates assignment to the other class. This motivates the names "negative class" and "positive class" used to discuss the two classes being considered by a binary classifier. While the sign of the score plays a role in determining which class the SVM would assign the new: example to, the magnitude of the score is less informative than a probability. The score gets larger if an example "belongs more" to that class than other examples, and it will get smaller if the example "belongs more" to the other class. Thus a high negative score signifies a high confidence that the SVM really believes the example belongs in the negative class, and a high positive score signifies a high confidence that the example belongs in the positive class.

This is unacceptable for broader application of SVMs however, because it is commonly known that having a classifier output probabilities of class membership are far more useful and effective. See, for example, Bishop1, listed in the table of Appendix 1. There are ways to convert SVM scores into probabilities, and these methods are known to those skilled in the art, as described in Platt1, Zadrozny1, Zadrozny2 and Sollich1.

The final problem is that sometimes the relationships between features used and class memberships are not linear. This motivates the kernel component of the SVM, which allows mapping features into nonlinear spaces representing much richer representations. This raises an issue of how to measure the appropriateness of the current representation, and how to know if the current set of features is a good one. If not, something else should be tried, or at a minimum, the system should report a diagnostic indicating the lack of confidence in its suitability to the problem. Classification algorithms have a hard time leaving the laboratory without this kind of feedback in order to be considered for industrial use.

Support Vector Machines are repeatedly more accurate than other classifiers, especially for sparse problems (e.g., small number of training documents or examples) with lots of features. See, e.g., Joachims1, Platt1, Sollich1, Dumais1, Hearst1. Additionally, there have been many advances in speeding up their training time, which have drastically improved the training computational requirements. See, e.g., Platt2, Keerthi1 and Joachims2.

Multi-class classification using the "one vs. all" and "one vs. rest" approach are already well known to those skilled in the art. See, e.g., Bishop1. Error correcting output codes (ECOC) have been shown to provide more accurate classification results when using linear classifiers. See, e.g., Dieterich1. More recently, this ECOC paradigm has been extended to include other code matrix representations and has shown more accurate and unified approaches to multi-class classification using binary classifiers. See, e.g., Allwein1, Zadrozny2.

It is commonly known to those skilled in the art that calibrating the output of a classification function is useful. See, e.g., RL1, Bishop1. How one calibrates the outputs of a classifier has been shown to be implementation dependent and has also been shown to depend on the classification algorithm in order to be effective. See, e.g., Platt1, Sollich1, PriceKnerr1, Bishop1, Zadrozny1.

In fact, recent work has even focused on combining the multi-class classification code matrix representation with the calibration of probability outputs. See, e.g., Zadrozny2.

Measuring a kernel's suitability to a problem's representation has also been the focus of much recent research. Most of this research however involves designing kernels to suite a problem better and not to measure whether or not a kernel's application is appropriate. Measuring a kernel's effectiveness on a problem can be handled relatively well by using a holdout or validation set if enough training examples are available. See, e.g., Bishop1. If a chosen kernel provides a poor performance measure then we know that the kernel is ineffective for this problem. However, determining the source of ineffectiveness is still hard to do, and it is unknown whether more training examples will solve the problem or not.

The term "hyperplane" is used herein in accordance with its ordinary technical meaning and, as known to those of ordinary skill in the art, refers to a linear equation of possibly many dimensions. A hyperplane in two dimensions is also often referred to as a line and a hyperplane in three dimensions is often referred to as a plane. When more than three dimensions are involved, the hyperplane is typically only referred to as a hyperplane.

The term "optimization," as used herein, refers to the practice, known to those of ordinary skill, of finding parameters for a function that yield a desired value, range of values, or an extreme value (e.g., a minimum or maximum) for the function's output value.

As used herein, a "kernel" refers to a Mercer Kernel which is a function between two vectors that defines a distance in accordance with the very general Mercer conditions. This class of functions are well known to those skilled in the art. See, e.g. Vapnik1. One particular kind of kernel is a "sigmoid function" known to those of ordinary skill to "squash" its domain to a continuous interval. The term "sigmoid" means "S-shaped." A detailed description of two kinds of sigmoid functions are in Bishop.

As used herein the term "transformation of feature vectors" is used in accordance with its ordinary meaning as understood by those of skill in the art and refers to changing a feature vector in accordance with a desired mathematical function.

BRIEF SUMMARY OF THE INVENTION

The present invention is a way of effectively dealing with the issues involved in multi-class SVM classification, determining if the chosen kernel is well suited for the given task, and effectively handling multi-class assignment of examples. As a starting point for building a multi-class SVM classifier in accordance with the present invention, in one embodiment, traditional binary SVM training and classification algorithms may be used to leverage their many benefits. These SVM algorithms are computationally efficient, well understood theoretically, accurate, and "reasonably complex" in that they handle the memorization/generalization learning tradeoff well. Since they are well studied, their implementation can be done efficiently and effectively, allowing efficient use of the information contained in the training examples to be used in building the final answer.

In a preferred embodiment, the output scores from the multi-class SVM classifier of the present invention are modified by transforming them using a sigmoid function to be a class membership probability. These scores can be calibrated to be well correlated with the true class probability distribution function using very few training examples due to a number of implementation details explained in further detail below. Because these outputs are probabilities, they can be used to make Bayes optimal decisions with respect to costs and category priors. Additionally, by transforming the original SVM score and not reformulating the classification problem to be more complex, the present invention maintains the SVM solution benefits (e.g. sparseness and accuracy) reported elsewhere.

In a further embodiment, the present system also detects when certain categories are difficult to classify and can even detect the source of the difficulty, or at least whether or not a current algorithm is well-suited for a current classification task, or if enough examples are present for training. Thus, the method and system of the present invention can be deployed on new classification problems and does not require statistics experts using the system to solve the classification problems.

DETAILED DESCRIPTION OF THE PREFERRED EMBODIMENTS

The invention, as described in detail below with reference to the figures, provides a method and system for providing an improved multi-category, or multi-class, classifier using a binary SVM algorithm. Although specific embodiments of the invention are described below, it is understood that the invention is not limited to these specific embodiments, which are provided as examples only.

Figure 1:
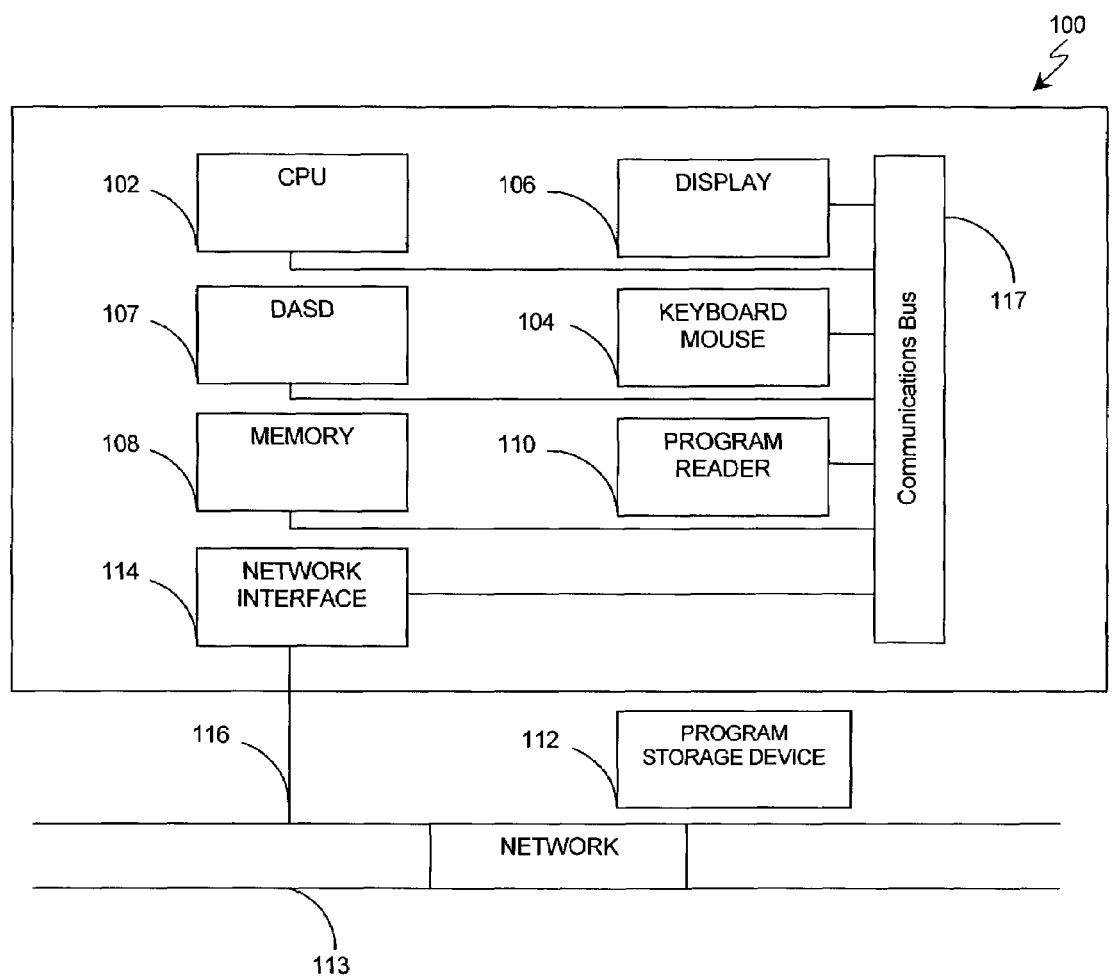
FIG. 1 illustrates a block diagram representation of an exemplary computer system that may be used in accordance with the present invention.

The present invention may be implemented using software on a computer system or other processing system. FIG. 1 is a block diagram of an exemplary computer 100 capable of carrying out the functionality of the invention described herein. Each computer 100 operates under control of one or more central processor units (CPUs) 102, such as a "Pentium®" microprocessor and associated integrated circuit chips, available from Intel Corporation of Santa Clara, Calif., USA. A computer can input commands and data from a keyboard and mouse 104 and can view inputs and computer output at a display 106. The display is typically a video monitor or flat panel display device. The computer 100 also includes a direct access storage device (DASD) 107, such as a fixed hard disk drive. The memory 108 typically comprises volatile semiconductor random access memory (RAM). Each computer preferably includes a program product reader 110 that accepts a program product storage device 112, from which the program product reader can read data (and to which it can optionally write data). The program product reader can comprise, for example, a disk drive, and the program product storage device can comprise removable storage media such as a floppy disk, an optical CD-Rom disc, a CD-R disc, a CD-RW disc, DVD disc, or the like. Each computer 100 can communicate with the other connected computers over the network 113 through a network interface 114 that enables communication over a connection 116 between the network and the computer. These devices have the ability to communicate with the other devices through a communications bus 117.

The CPU 102 operates under control of programming steps that are temporarily stored in the memory 108 of the computer 100. When the programming steps are executed, the pertinent system component performs its functions. Thus, the programming steps implement the functionality of the system described herein. The programming steps can be received from the DASD 107, through the program product 112, or though the network connection 116. The storage drive 110 can receive a program product, read programming steps recorded thereon, and transfer the programming steps into the memory 108 for execution by the CPU 102. As noted above, the program product storage device can comprise any one of multiple removable media having recorded computer-readable instructions, including magnetic floppy disks, CD-Rom, and DVD storage discs. Other suitable program product storage devices can include magnetic tape and semiconductor memory chips. In this way, the processing steps necessary for operation in accordance with the invention can be embodied on a program product.

Alternatively, the program steps can be received into the operating memory 108 over the network 113. In the network method, the computer receives data including program steps into the memory 108 through the network interface 114 after network communication has been established over the network connection 116 by well known methods that will be understood by those skilled in the art without further explanation. The program steps are then executed by the CPU 102 to implement the processing of the system. As known to those skilled in the art, other computing machines and systems having alternative architectures and constructions may be implemented to support the various functions of the invention described herein.

The present invention invokes the following procedure to decompose a multi-class problem into binary classification procedures for use in multi-class classification.

Figure 2:
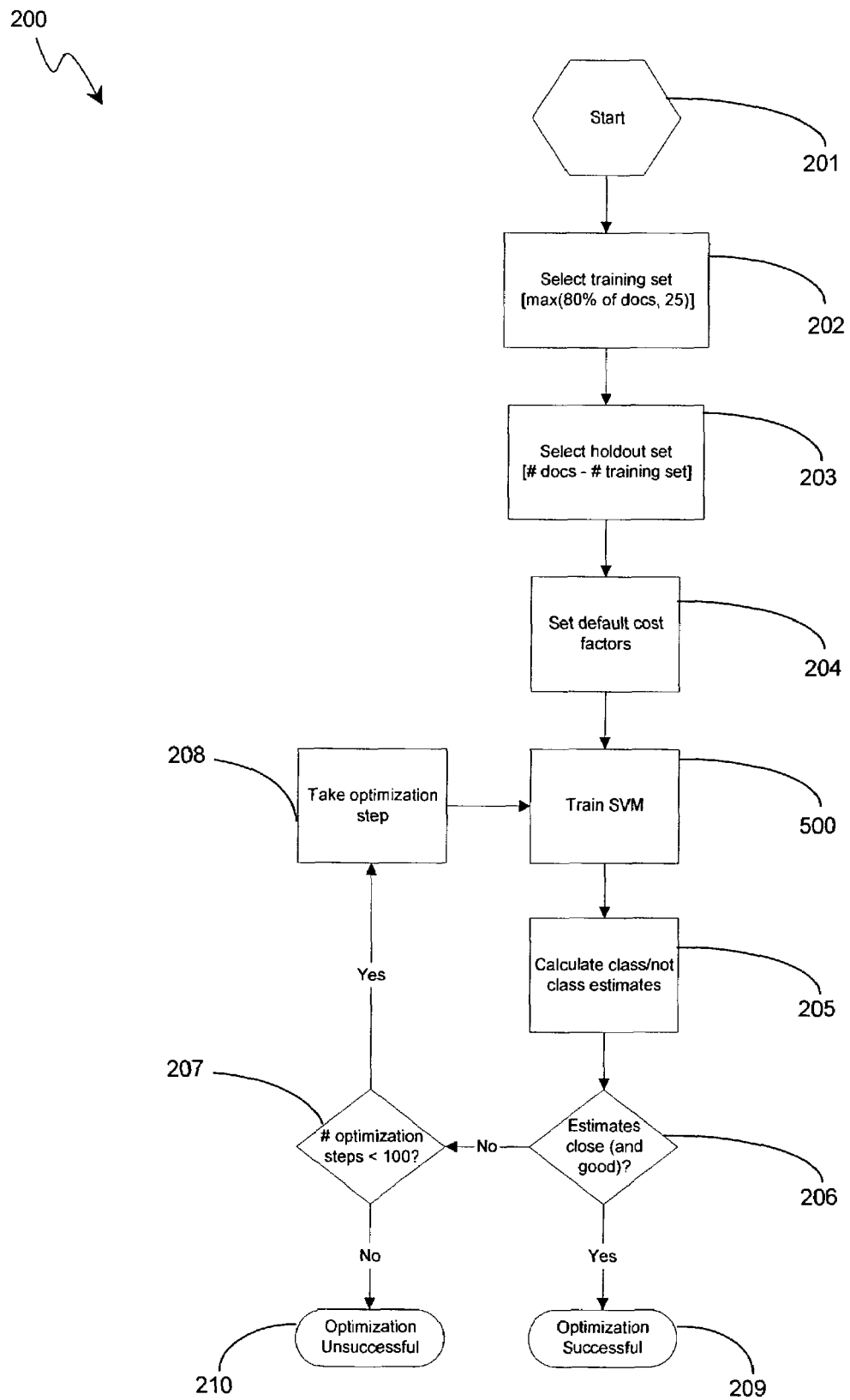
FIG. 2 illustrates a control flow diagram for optimizing the cost factors for a single binary SVM, in accordance with one embodiment of the invention.

FIG. 2 illustrates a flow chart diagram of a process of training a single binary SVM, in accordance with one embodiment of the invention. For purposes of the following discussion, we assume that the examples comprise a plurality of text documents belonging to multiple categories. However, it is understood that the invention is not limited to classifying text documents but may be utilized to analyze and categorize/classify many different types of information, graphics, patterns, etc. Starting at 201 all examples are assumed to be assigned to either a positive or negative class. The examples, used to find the maximal hyperplane are selected at step 202. The number of examples are generally a large percentage of the total number of documents and, in one embodiment, the number of examples must be greater than a predetermined threshold. The rest of the documents are allocated to a holdout (a.k.a. validation) set at step 203. At step 204, an initial guess is used for the negative and positive class' cost factors and then, at step 500 (described in further detail with respect to FIG. 5) the SVM training algorithm is used to find the maximal margin hyperplane. Once the hyperplane is found, a test is performed at step 205 to determine if the solution is a good one. The details of performing this test to determine when a "good" hyperplane has been found are described below, in accordance with one embodiment of the invention.

If the solution is a good one, the optimization procedure exits and returns the solution at step 209. If the solution is not a good one, an optimization step is taken according to a numerical optimization routine 208, as long as the number of iterations taken during optimization is not above some practical limit as determined at step 207. Such methods of optimization are known to those skilled in the art. See, e.g., NumRecipies1. If the number of iterations taken is larger than some practical limit, at step 210 the process generates a message indicating that the system could not find an optimized solution.

Examples that belong in more than one category are often problematic for training a binary SVM. Therefore a method and procedure for coping with this problem is required. There are four possible solutions: assign the example to the positive class, assign the example to the negative class, assign the example to both classes, or assign the example to neither class (e.g. remove the example from the example set). Assigning the example to both classes is problematic for a number of reasons. At the most practical level however, it is important to use second derivative information in order to find the optimal SVM hyperplane solution efficiently, and the second derivative will be undefined at this point. Assigning the example to neither class is unfortunate for two reasons: it wastes training information for each of the two categories and it wastes information regarding which examples are supposed to be in both categories.

Therefore, in one preferred embodiment, the present invention places the example in the positive class. This has the fortunate effect of making the binary SVMs task very clear: predict if an example belongs in this category. Whether the example belongs in other categories is irrelevant. The answer to multi-class classification can be handled elsewhere. Thus, in one preferred embodiment, if any example belongs to more than one category, including a current category, the example is assigned to the positive class.

In one embodiment, a soft margin, binary SVM algorithm is used. In a further embodiment, the soft margin algorithms used have a separate cost factor (v) for the negative and positive class. The major effect this has is to represent prior probabilities ("priors") associated with a class independently from the point of view of the binary classifier. This is a classic problem in a "one vs. rest" multi-class decomposition; the priors for the negative class can be relatively high because it consists of all of the other categories. In order to put both categories on more of an equal footing, the cost factors for each class can be allowed to vary independently. This method of "dual cost factor" analysis is known in the art and further described in, for example, Morik1. In addition, optimizing the cost factors helps find the optimal solution with regard to memorization and generalization. When cost factors are chosen close to their optimal values for a particular task, the empirical probability of the class given the SVM score often has the property of q(C|s|)=1−q(C|−|s|), where s is the raw SVM classification score.

The desired effect when testing a binary solution is to enforce that the hyperplane is as close to the Bayes Optimal Decision Boundary as possible. See, e.g., Bishop1. These two probabilities must be estimated without their respective class priors.

If a "good" hyperplane is found, it will lie close to the optimal decision boundary p(C|s=0)=1−p(C|s=0)=0.5. If the hyperplane is not close to this solution, then the problem is inherently not represented well for a linear classifier in the current feature space. Either the features used or the kernel must change. On the other hand, if the point can be reached, but the accuracy of the classifier is poor for this category, then more training data is used to determine more about what is going wrong. The addition of more training data will either help the classifier find the correct decision boundary after optimization, or it will determine that the distribution is poorly suited to the features/kernel in use. However, adding more training data is generally the responsibility of a person or process outside of the present invention, so these conditions are considered cause to remove the category and report the problems to the system's user.

In summary, the combination of optimizing the cost factors, ensuring that a good decision boundary is found, and assigning ambiguous documents only to the positive class often leads to an empirical class probability distribution given the score that is monotonic, p(C|s=0)=0.5, p(C|s)=1−p(C|−s), and the probability of class membership goes to 0 and 1 as the SVM scores s go to either limit. The fact that the data often fulfill (or closely fulfill) these properties allows one to calibrate scores effectively and accurately with a small number of training documents only.

As mentioned earlier, a linear classifier can be formulated as learning a decision function that when positive indicates membership in one class and when negative indicates membership in the other class. This is derived as follows:

$$s = Lg\left(\frac{p(C|x)}{p(\overline{C}|x)}\right) = Lg\left(\frac{p(C|x)}{1-p(C|x)}\right)$$

$$e^s = \frac{p(C|x)}{1-p(C|x)}$$

$$e^s(1-p(C|x)) = p(C|x)$$

$$e^s - e^s p(C|x) = p(C|x)$$

$$e^s = e^s p(C|x) + p(C|x)$$

$$e^s = p(C|x)(e^s + 1)$$

$$\frac{e^s}{e^s+1} = p(C|x)$$

-continued $$\frac{1}{1+e^{-s}} = p(C|x)$$

This property of linear classifiers is well known to those skilled in the art. See, e.g., Bishop1, Platt1, Sollich1. However, the SVM algorithm generally outputs scores that are not well calibrated to these probability values. This means that for every class, the slope of the probability curve must be re-scaled and thus the present invention introduces a slope parameter A which can be optimized. Thus the actual transformation used is $$\frac{1}{1+e^{-As}}.$$

When the SVM classifies a new example, the score reported is transformed using this sigmoid with the re-scaled slope. Efficient methods of optimizing binomial distributions such as the above transformation function are known to those skilled in the art. See, e.g., Bishop1, Platt1. As described in further detail below, in one embodiment, the method of optimizing a binomial distribution as described in Platt1 is implemented, with the exception that the second parameter B mentioned in Platt1 is not used. Therefore, all calculations involving B or its derivatives are removed.

Additionally it should be noted that optimizing the slope parameter on the training examples used to find the maximum margin hyperplane can introduce a significant bias in optimizing the sigmoid parameters because the SVM solution forces the alignment of many training examples to be exactly 1.0 or −1.0. See, e.g., Platt1. However, it is a property of the SVM that only unbound support vectors display this behavior. Therefore, this bias can be at least partially alleviated by adding all training documents to the optimization procedure except those training documents characterized by unbound support vectors.

The sigmoid function's parameter (A) is relatively constrained at this point. By ensuring that the optimization routine worked, the bias (offset) is set close to its "correct" point (which is why this parameter is not re-optimized). Additionally, the end points of the sigmoid function are fixed at 0 and 1 by construction and, as discussed above, only those training documents that do not introduce a significant bias in the optimized probability distribution (i.e., those having no unbound support vectors) are added to the optimization procedure. These factors all contribute to providing an optimization procedure that finds a good solution, or knows when it hasn't, with relatively few examples.

When a new example is to be classified, it is first converted into a feature vector. This feature vector is then classified using all SVM binary classifiers via standard methods and procedures. See, e.g., Dumais1, Joachims1. The scores are all transformed using the sigmoid function optimized for each category and the outputs (being probabilities) are returned to the caller. The caller is then free to accept or reject categories based on the classification probabilities for each category. If all misclassifications are equally costly, maximum accuracy will generally be achieved by choosing a threshold of 0.5. By placing an example into all categories with an output score of 0.5 or higher, the classification error is expected to be minimal.

However, if misclassifications are not equally costly, an adjustment must be made. Additionally if the category priors of the example data are representative of the true distribution priors, then those category priors should be used in the classification decision. These are both common procedures to those skilled in the art when the output of every classifier is a probability. See, e.g., Bishop1. Category priors and cost matrices can be used to adjust the final decision function in a principled way. Additionally, often the class priors are quite easy to estimate (in contrast to the category membership probabilities), so simple counting can be an effective method for estimating them.

Figure 3:
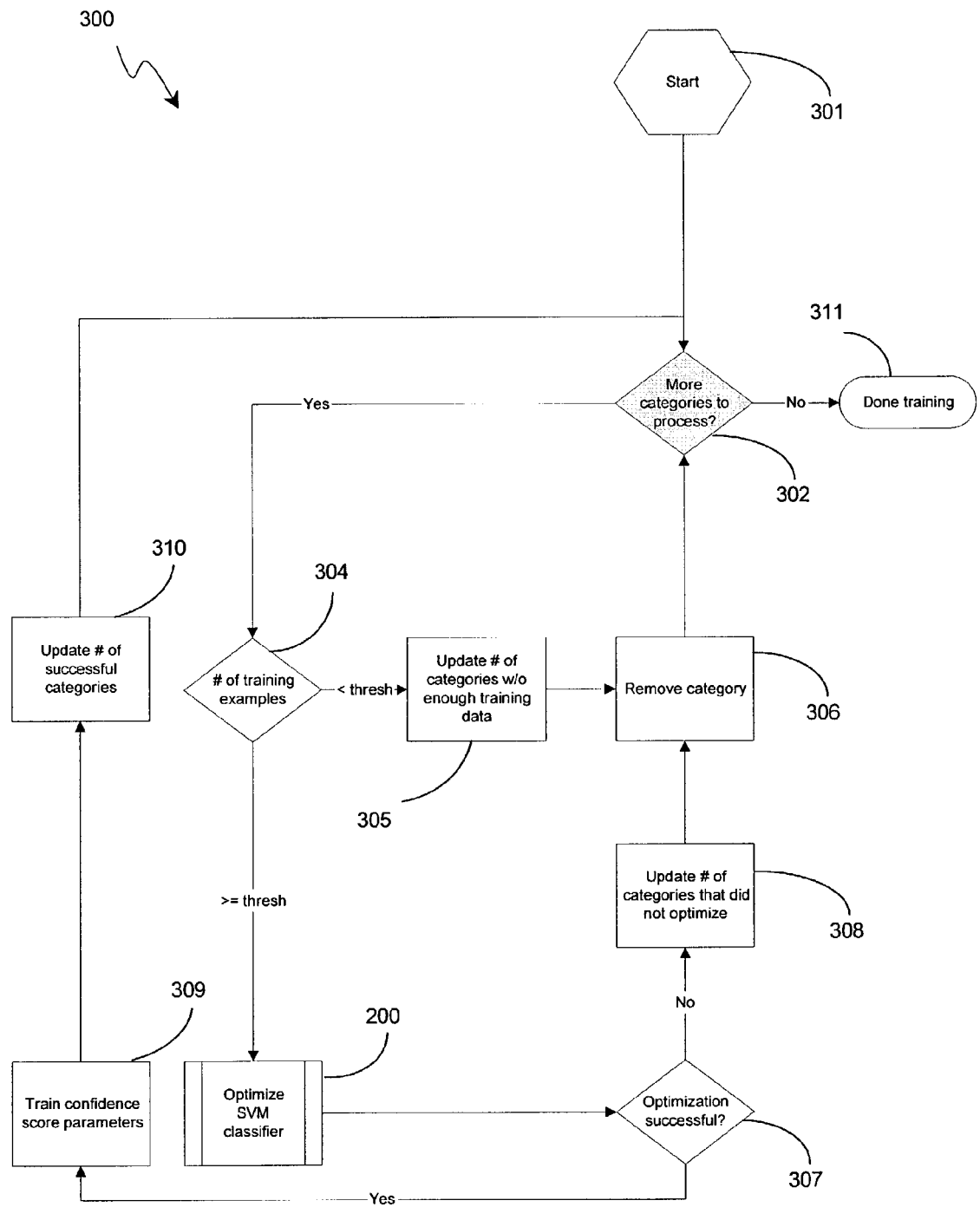
FIG. 3 illustrates a control flow diagram for training a set of SVM classifiers, in accordance with one embodiment of the invention.

FIG. 3 illustrates a control flow diagram of a process of training a set of binary SVM classifiers to obtain an effective multi-category classification system, in accordance with one embodiment of the invention. Each category is processed independently throughout the process 300. The process begins at step 301 and at step 302, determines if there are any categories to process. If so, the next one is chosen according to a predefined criteria (e.g., alphabetical order, most no. of examples, etc.). Alternatively, if all categories have been processed, then the training process terminates at step 311. At step 304, a determination is made as to whether the number of examples for the current category is above a threshold. Appropriate values for this threshold are task specific, but typical values are 5-100. If the number of examples is less than this predetermined threshold, then at step 305, the process puts the category in a list of categories removed due to an inadequate number of training examples. After step 305, the category is removed by step 306 and the process is repeated for the next category at step 302. If the number of examples is greater or equal to the threshold, processing continues at step 200 by performing a procedure for optimizing a binary SVM classifier for this category, as described above with respect to FIG. 2, in accordance with one embodiment of the invention.

Once optimization is complete, it returns an indication as to whether or not optimization was successful. Step 307 then passes control on to step 309 if optimization was successful, or to step 308 if it was not. At step 308, the system records in a list that this category was not successfully optimized. This list is distinct from the one maintained by step 305. After updating the list, the category is removed by step 306 and the process repeats for the next category at step 302 as described above.

If optimization was successful, step 309 optimizes a function to calibrate the output of the binary SVM classifier to be a probability of class membership. This process is performed by using a sigmoid function to transform the score's domain from all real numbers to the range (0, 1). The sigmoid function is known to those in the art (see, e.g., Bishop1, Platt1, Sollich1, Dumais1), but written below for convenience.

$$\frac{1}{1+e^{-As}}$$

The variable s is the binary SVM classifier score, e is the base of the natural logarithm, and A is the parameter optimized to adjust the slope of the sigmoid function. Those skilled in the art will note that this equation is different from the equation described in Platt1, Sollich1 and Dumais1. It is different because there is one fewer degree of freedom. Specifically, there is no additional bias term to adjust the sigmoid offset.

Efficient methods of optimizing a binomial distribution are known to those skilled in the art. See, e.g., Bishop1, Platt1. In one embodiment, the procedure at step 309 performs a method of optimizing a binomial distribution as described in Platt1, with the exception that the second parameter B mentioned in Platt 1 is not used. Therefore, all calculations involving B or its derivatives are removed. One example of a modified pseudo-code for optimizing only the binomial distribution's slope is attached as Appendix 2. These types of pseudo-codes are known in the art. See, e.g., Platt1.

In a further embodiment of the invention, after completion of classifier training as discussed above, the resulting classifier is employed to classify a new text object and the classifier returns the top N scores with a threshold above a pre-specified value t. Both N and t are supplied at the time of the call. An array of categories and probabilities are returned to the caller.

In a further embodiment, to adjust misclassification costs or to add distribution prior information, the user of the classification system can implement well-known techniques for performing these adjustments and, thereafter, adjust the acceptance thresholds (e.g., the parameter t discussed above) for each category accordingly. An exemplary method involves constructing a prior probability and cost matrices for each class, multiplying the class probability estimates by this prior and cost matrix, and producing a resultant class score matrix. See e.g. Bishop1.

After calibrating the outputs of the SVM classifier to be class membership probabilities as discussed above, at step 310, the process adds the current category to a list of categories that were successfully optimized. This third list is different from the lists generated by steps 305 and 308, as described above. After updating this list, the process is repeated on the next directory at step 302. Finally, at step 311, the process 300 terminates by moving on to step 404, as discussed in further detail below with respect to FIG. 4.

Figure 4:
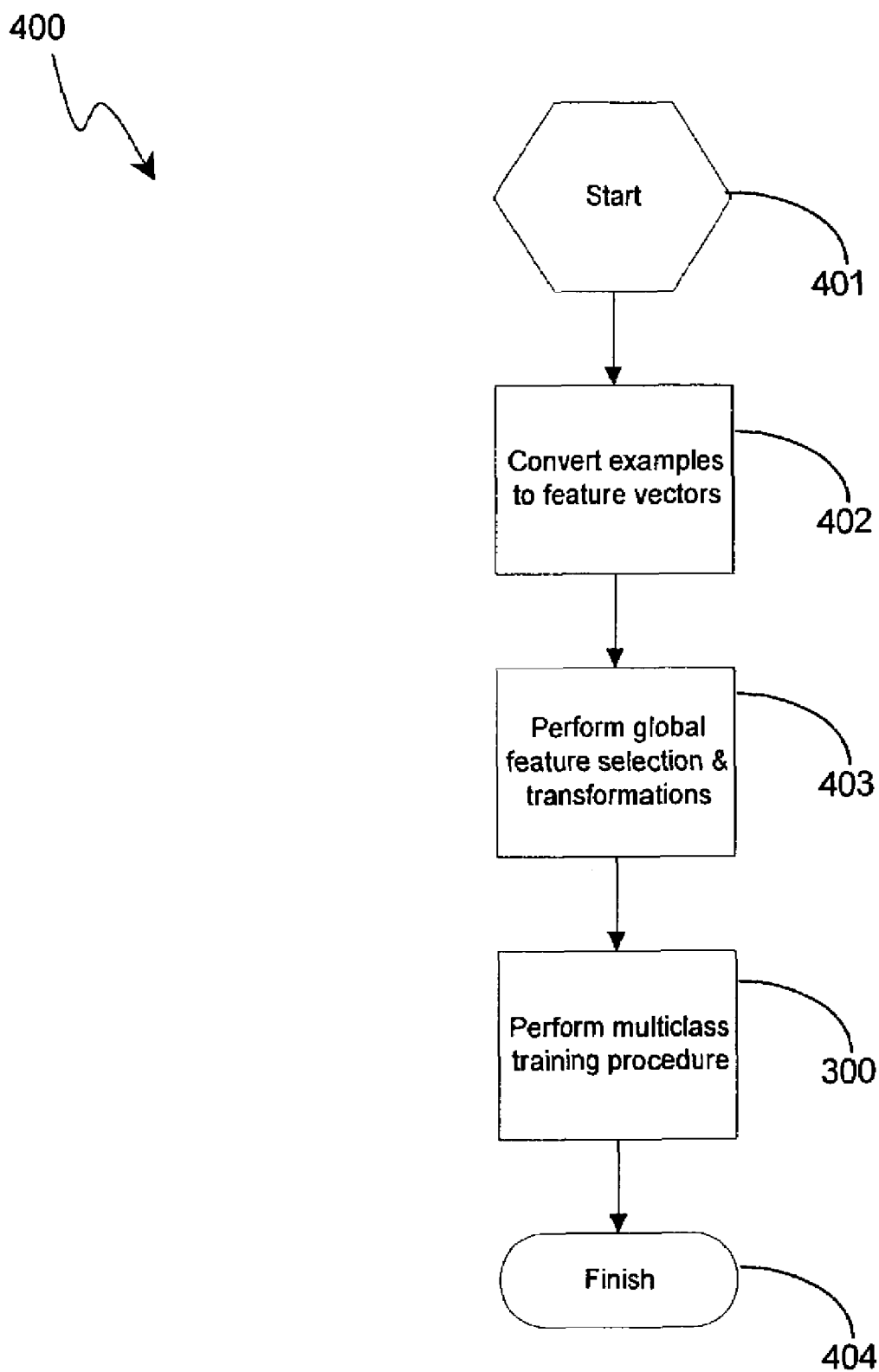
FIG. 4 illustrates a control flow diagram for starting a multi-class classification problem, in accordance with one embodiment of the invention.

FIG. 4 illustrates a control flow diagram for starting a multi-class classification problem, in accordance with one embodiment of the invention. Assuming a set of categories are available, and a set of examples for each category are available, those are input to the system at step 401. Then the examples are converted into "features" using a task specific method at step 402. For example, if the task involves classifying text documents, each feature can be a unique word and the value of a feature is the number of times a respective word occurs in a document. At step 403, global properties of the example data are taken into account and used to transform and selected features. Exemplary methods for transforming and selecting features are discussed in further detail below.

After step 403 is completed, the process moves to step 300 where the steps for performing a multi-class training procedure are executed, as described above with respect to FIG. 3 in accordance with one embodiment of the invention. After this training procedure is completed, the process finishes as step 404.

Figure 5:
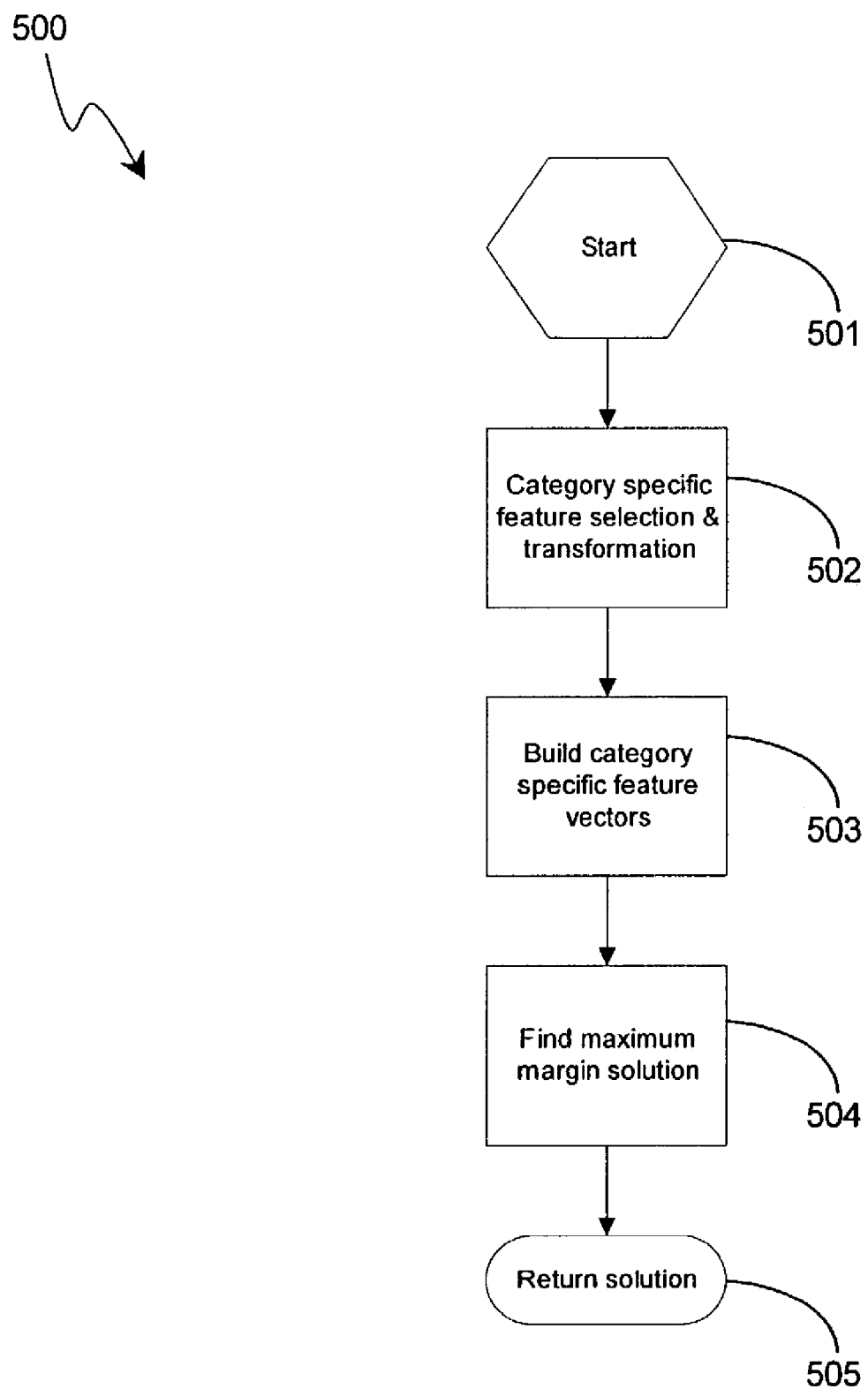
FIG. 5 illustrates a control flow diagram for training a single binary SVM classifier, in accordance with another embodiment of the invention.

FIG. 5 illustrates a control flow diagram for training a single binary SVM classifier in accordance with one embodiment of the invention. Procedures to do this are well known to those of ordinary skill in the art and are discussed thoroughly in Dumais1, Joachims1, Platt2, Hearst1, Keerthi1 and Joachims2, for example. The process begins at step 501. At step 502, category specific feature selection and transformations are performed. Exemplary methods for feature selection as discussed in Dumais1, for example, include Mutual Information, Information Gain, Cross Entropy and Principal Component Analysis. An exemplary method for feature transformation is the Inverse Document Frequency (IDF) scaling for text classification discussed in Dumais1 and Joachims1, for example. Another feature transformation technique known to those of ordinary skill is to convert all feature values into Z-scores which means all feature values will have values of zero mean and unit variance, rendering them more fairly comparable. This is discussed in Bishop1, for example.

Once the above-described feature selection and transformation procedures are completed, the results are represented as category specific feature vectors. They differ from the original feature vectors because of the category specific feature selection and transformations that were employed. For example, in the context of text classification, a feature vector (e.g., a unique word) may be transformed by dividing the word frequency by a corresponding IDF value. In one embodiment it is convenient to change the internal representation of the feature vectors, for example using dense vector instead of sparse vector representations, in order to improve computational efficiency when many elements of the vectors have nonzero values. This construction of category specific feature vectors, based on the results of step 502, is performed at step 503. Step 504 performs the procedure for finding the maximum margin hyperplane for an SVM. Methods for doing this are well known to those in the art, see Dumais1, Platt2, Joachims1, Joachims2, Keerthi1, and Hearst1. Finally, at step 505 the solution (e.g. the maximum margin hyperplane) is returned and control resumes at step 205, FIG. 2.

Figure 6:
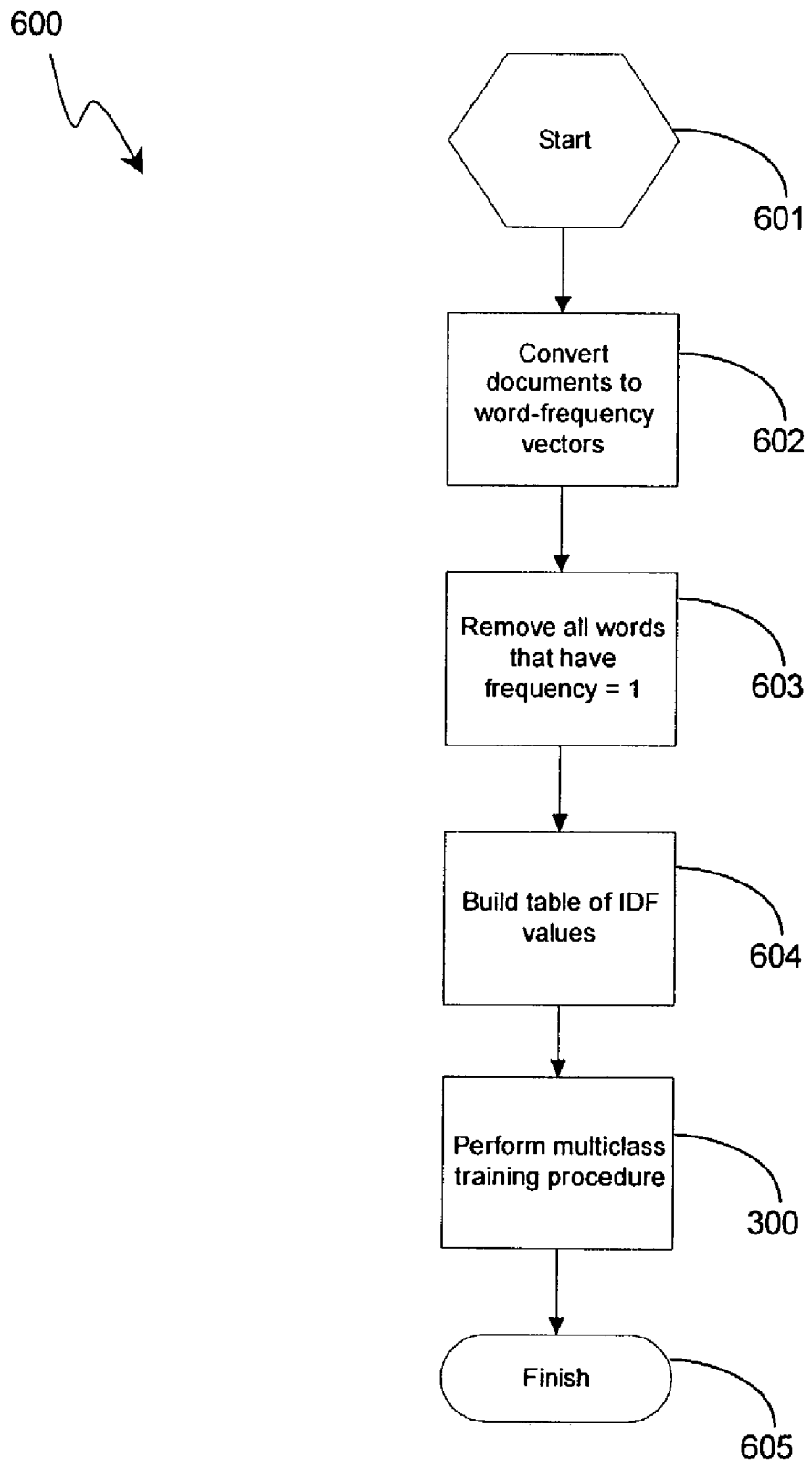
FIG. 6 illustrates a control flow diagram for starting a text multi-class classification problem; in accordance with one embodiment of the invention.

The control flow diagram of FIG. 6 illustrates an exemplary procedure and method for starting a text multi-class classification problem, in accordance with one embodiment of the invention. The current embodiment is written in C++ and thus control flow is managed through procedure calls. In a preferred embodiment, the data structures are stored in both RAM and secondary storage (e.g., a hard disk drive).

In one embodiment, the invention may be used in the text classification domain. In a preferred embodiment, a text classifier uses a bag of words representation (e.g. a multinomial representation) where each feature is a unique word and the value of the feature is the number of times it occurred in the document. The features are rescaled according to their inverse-document frequency which is familiar to those in the art. The feature vectors are then rescaled such that the L2 norm=1.0 for each feature vector where the L2 norm represents the magnitude of a feature vector. This technique is also well known to those skilled in the art. See, e.g., Platt1, Dumais1, Joachims1. The feature vectors are stored as sparse vectors but the final weight vector produced is stored as a dense vector (i.e., a vector having mostly non-zero values).

Assuming a set of categories are available, and a set of example text objects (e.g. text files) for each category are available, those are input to the system at step 601. This is done by defining an "on-disk" directory for each category, and putting text documents in each directory where they belong. The C++ program then walks the directory tree and processes each file, loading the entire set of directories and files into memory. A tree structure is created associating every text document to every category. At step 602, each example document is converted into a word-frequency vector using a "bag of words" method known to those skilled in the art, as described in Joachims1, Joachims2, Platt1, Dumais1, and Hearst1, for example. In one embodiment, all words that do not occur at least twice in the entire example set are removed at step 603. At step 604, a table of IDF values for the remaining words is then built using methods known to those in the art. See, e.g., Dumais1, Joachims1. Finally, the multi-class training procedure 300 is used to build a set of SVM classifiers for multi-class classification, as described above with respect to FIG. 3.

After completion of the subroutine steps illustrated in FIG. 3, and discussed above, the procedure returns control to process 600 which terminates at step 605. This procedure then saves the trained parameters to a disk or other memory and returns program control to an external software program (e.g. an operating system such as Windows NT°).

Figure 7:
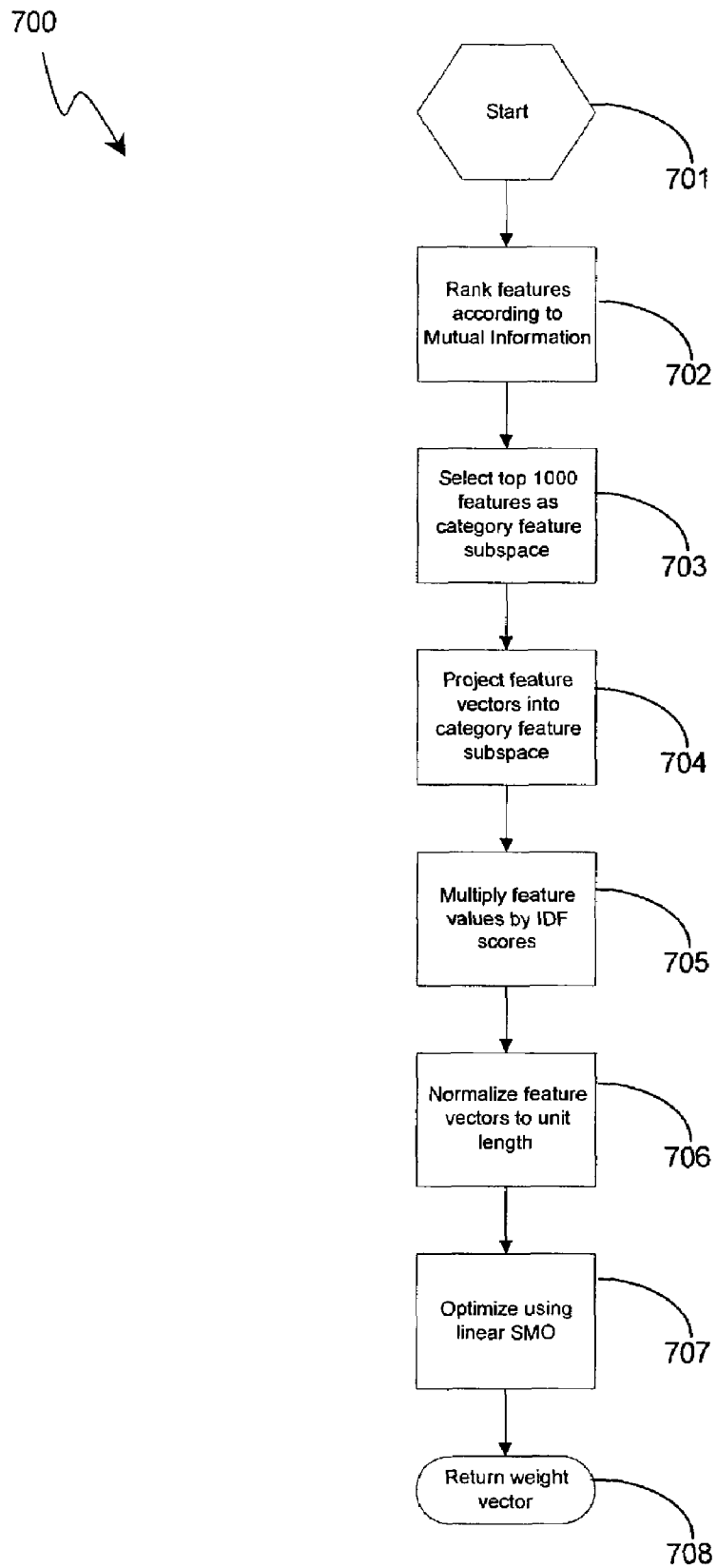
FIG. 7 illustrates a control flow diagram for training a single text classification binary SVM classifier, in accordance with one embodiment of the invention.

FIG. 7 illustrates an exemplary procedure used to train a single text classification binary SVM classifier, in accordance with one embodiment of the invention. This procedure for text classification is a specific embodiment of the more general procedure 500 depicted in FIG. 5. Thus, in one embodiment, the step from 204 to 500 to 205 is replaced by a control flow from 204 to 700 to 205.

In step 702, The features are ranked according to the amount of Mutual Information they have with the positive category. This represents how well the features predict class membership. At step 703, a predetermined number (e.g., 1,000) of features with the highest amount of mutual information are kept, and the remaining features are not used. Step 704 constructs a dense vector with the 1,000 entries to store the values for the 1,000 features selected. At Step 705, the feature value for each of the 1,000 words is multiplied by the corresponding word's IDF value in the IDF table built in step 604. Step 706 rescales the feature vector to have an L2 norm of 1. This is done by dividing each feature value by the square root of the sum of the squares of each feature value.

At step 707 the maximum margin hyperplane for an L2norm soft margin linear SVM is obtained. One method of optimizing an SVM with dual (e.g., positive and negative) cost factors is an algorithm based on Platt's Sequential Minimal Optimization (SMO) procedure. See, e.g., Platt 2, Dumais 1 . In one embodiment, modifications are made to improve the algorithm's convergence speed and the computational efficiency in accordance with well known techniques. See, e.g., Keerthi 1 . Additionally in the context of text classification, linear kernels seem to be both computationally efficient and accurate. Therefore in one embodiment, the classifier uses modifications known to those skilled in the art inside of the SMO procedure to speed up the optimization procedure. See, e.g., Platt 2 . This procedure involves maintaining the explicit weight vector in memory, as opposed to maintaining only the linear coefficients for each support vector. This optimization is available if a linear kernel is used. In one approach, the SVM classifier is based on a formulation having two cost factors (one for a positive class, one for a negative class) as follows:

$$\min\left[\frac{1}{2}\sum_i\sum_j \alpha_i \alpha_j y_i y_j K(x_i, x_j) - \sum_i \alpha_i\right]$$

where:

$\alpha_1$ is a Lagrange multiplier for example $X_i$, $$y_i = \begin{cases} +1, \text{ iff } x_i \text{ is in the positive class} \\ -1, \text{ iff } x_i \text{ is in the negative class} \end{cases},$$

φ(x) is a function that maps input vectors to feature vectors, $$\kappa(x_i, x_j) = \phi(x_i) \cdot \phi(x_j)$$

Subject to the constraints:

$$0 \le \alpha_i \le C_+, \forall \{i \mid y_i = +1\}$$
$$0 \le \alpha_i \le C_-, \forall \{i \mid y_i = -1\}$$
$$\sum_i y_i \alpha_i = 0$$

where $C^+$ and $C^-$ are the two user definable cost factors. In another approach, the SVM classifier is based on a formulation having two cost factors (one for a positive class, one for a negative class), as follows:

$$\min\left[\frac{1}{2}\|w\|^2 - \sum_i \alpha_i\right]$$

where:

$\alpha_1$ Lagrange multiplier for example $X_i$, $$y_i = \begin{cases} +1, \text{iff } x_i \text{ is in the positive class} \\ -1, \text{iff } x_i \text{ is in the negative class} \end{cases},$$

φ(x) is a function that maps input vectors to feature vectors, $$w = \sum_i \alpha_i y_i \Phi(x_i)$$

subject to the constraints $$0 \le \alpha_i \le C_+, \forall \{i \mid y_i = +1\}$$
$$0 \le \alpha_i \le C_-, \forall \{i \mid y_i = -1\}$$
$$\sum_i y_i \alpha_i = 0$$

where w is the weight vector perpendicular to the hyperplane, $C^+$ and $C^-$ are the two user definable cost factors.

In one embodiment of the present invention, the method estimates the quality of the learned decision boundary at step 205 by combining a F1 measure estimation on the holdout set with a εαF1 measure estimation using the training set, where the F1 measure estimation is the harmonic mean between precision and recall (a.k.a. Type I and Type II errors in statistics). The ξαF1 estimation technique described in Joachims2 involves calculating the number of potentially misclassified training examples. These are the examples that are either misclassified in the training set or are to close to the hyperplane and thus a "similar" new example would have a good chance of being misclassified. See, Joachims2 for a full description of the technique. These two estimations are combined using a weighted average. The weight for each estimate is equal to the number of documents used to calculate the estimate, and then the result is divided by the total number of documents used to create both estimates.

In a preferred embodiment, this quality measure is created for both the positive and negative classes at step 205. In another embodiment, step 206 is performed by comparing the harmonic mean between the two estimates to the arithmetic mean. If the relative difference is greater than 0.05, it is considered a poor solution, and if the difference is less than this threshold it is considered an acceptable solution.

A program, in accordance with one embodiment of the present invention, was run on an industry and academic standard text classification dataset. This dataset is referred to as Reuters 21578 and is known to those skilled in the art. In particular, for generating a testing and training split, the Mod-Apte division was used to train and obtain performance for the current embodiment. The results published by Dumais2 are provided in the table below. Also included are the results obtained in accordance with one embodiment of the present invention.

|  | FindSim | NBayes | BayesNets | Trees | Microsoft classifier linear SVM | Present Invention linear SVM |
|---|---|---|---|---|---|---|
| Earn | 92.9 | 95.9 | 95.8 | 97.8 | 98.0 | 98.4 |
| Acq | 64.7 | 87.8 | 88.3 | 89.7 | 93.6 | 97.5 |
| money-fx | 46.7 | 56.6 | 58.8 | 66.2 | 74.5 | 83.4 |
| Grain | 67.5 | 78.8 | 81.4 | 85.0 | 94.6 | 94.7 |
| Crude | 70.1 | 79.5 | 79.6 | 85.0 | 88.9 | 89.1 |
| Trade | 65.1 | 63.9 | 69.0 | 72.5 | 75.9 | 89.8 |
| Interest | 63.4 | 64.9 | 71.3 | 67.1 | 77.7 | 81.2 |
| Ship | 49.2 | 85.4 | 84.4 | 74.2 | 85.6 | 86.9 |
| Wheat | 68.9 | 69.7 | 82.7 | 92.5 | 91.8 | 86.4 |
| Corn | 48.2 | 65.3 | 76.4 | 91.8 | 90.3 | 77.1 |
| Avg Top 10 | 64.6 | 81.5 | 85.0 | 88.4 | 92.0 | 94.6 |

The above Table 1 provides classification precision-recall breakeven points for the Reuters 21578 mod-apte split. Each category's breakeven point listed is the breakeven point for the category's precision and recall. The average of the "top 10" results is the breakeven point for the combined (multi-class) decision function's performance measured using micro averaged precision and recall.

As described above, the invention provides an improved method and system for reliably and efficiently performing multi-class classification of information (e.g., documents). One of ordinary skill in the art will appreciate that the above descriptions of the preferred embodiments are exemplary only and that the invention may be practiced with modifications or variations of the techniques disclosed above. Those of ordinary skill in the art will know, or be able to ascertain using no more than routine experimentation, many equivalents to the specific embodiments of the invention described herein. Such modifications, variations and equivalents are contemplated to be within the spirit and scope of the present invention as set forth in the claims below.

APPENDIX 1

| REFERENCE | CITATION |
|---|---|
| Platt1 | Platt, J. C., 1999, Probabilistic Outputs for Support Vector Machines and Comparisons to Regularized Likelihood Methods. Advances in Large Margin Classifiers, MIT Press. |

APPENDIX 1-continued

| REFERENCE | CITATION |
|---|---|
| Sollich1 | Sollich, P., 2000, Probabilistic Methods for Support Vector Machines. Advances in NIPS, 12:349-355 |
| RL1 | Richard, M. D. and R. P. Lippmann, 1991, Neural Network Classifiers Estimate Bayesian a-posteriori Probabilities. Neural Computation 3 (4), 461-483. |
| Bishop1 | Bishop, C., M. 1995, Neural Networks for Pattern Recognition, Oxford University Press Inc., New York, 27, 77-85, 230-247, 295-300, 343-345. |
| PriceKnerr1 | Price, D., Knerr, S., 1994, Pairwise Neural Network Classifiers With Probabilistic Outputs. Neural Information Processing Systems, vol. 7. |
| Zadrozny1 | Zadrozny, B., Elkan, C., 2002, Transforming Classifier Scores Into Accurate Multiclass Probability Estimates. Proceedings of the Eighth International Conference on Knowledge Discovery and Data Mining (KDD'02). |
| Dumais1 | Dumais, S. T., Heckerman, D., Horvitz, E., Platt, J. C., Sahami, M., 2001, Methods and Apparatus for Classifying Text and for Building a Text Classifier. U.S. Pat. No. 6,192,360 B1 |
| Joachims1 | Joachims, T., 1997, Text Categorization with Support Vector Machines: Learning with Many Relevant Features. |
| Schütz1 | Schütz et al, No date, A Comparison of Classifiers and Document Representations for the Routing Problem. Xerox Palo Alto Research Center. |
| Dietterich1 | Dietterich, T. G., et al, 1995, Solving Multiclass Learning Problems via Error-Correcting Output Codes. Journal of Artificial Intelligence Research (2), 263-286. |
| Zadrozny2 | Zadrozny, B., 2001, Reducing Multiclass to Binary by Coupling Probability Estimates. NIPS. |
| Allwein1 | Allwein, B., Schapire, R., Singer, Y., 2000, Reducing Multiclass to Binary: A Unifying Approach for Margin Classifiers. Proceedings of the $17^{th}$ International Conference on Machine Learning, 113-141. |
| Platt2 | Platt, J. C., 1999, Fast Training of Support Vector Machines Using Sequential Minimal Optimization. Advances in Kernel Methods - Support Vector Learning, p. 41-65. |
| Platt3 | Platt, J. C., Cristianini, N., Shawe-Taylor, J., 2000, Large Margin DAGs for Multiclass Classification. Advances in Neural Information Processing Systems 12, 547-553. |
| Hearst1 | Hearst, M., A., Schölkopf, B., Dumais, S., Osuna, E., Platt, J., 1998, Trends and Controversies - Support Vector Machines. IEEE Intelligent Systems, 13 (4) 18-28 |
| Keerthi1 | Keerthi, S., S., Shevade, K., S., Bhattacharyya, C., Murthy, K., R., K, 1999, Improvements to Platt's SMO Algorithm for SVM Classifier Design |
| Joachims2 | Joachims, T., 1999, Making Large Scale SVM Learning Practical. Advances in Kernel Methods - Support Vector Learning. MIT Press. |
| NumRecipes1 | Press, W. H., Teukolsky, S. A., Vetterling, W. T., Flannery, B. P., 2002, Numerical Recipes in C++: The Art of Scientific Computing $2^{nd}$ Edition. Cambridge University, 413-417. |
| Weston1 | Weston, J. & Watkins, C. Multi-class Support Vector Machines. CSD-TR-98-04, Royal Holloway, University of London, Egham, UK, 1998. |
| Mayoraz1 | Mayoraz, E. & Alpaydin, E., 1999, Support Vector Machines for Multi-class Classification, IWANN, Alicante, Spain. |
| Moreira1 | Moreira, M. & Mayoraz, E., 1997, Improved Pairwise Coupling Classification with Correcting Clasifiers', IDIAPA-RR 97-09. |
| Guermeur1 | Guermeur, Y., Elisseeff A. & Paugam-Moisy, H., 2000, A new multi-class SVM based on a uniform convergence result. IJCNN, Como, Italy |
| Bredensteiner1 | Bredensteiner, E. J. & Bennett, K. P., 1999, Multicategory Classification by Support Vector Machines. Computational Optimization and Applications. |
| Hsu1 | Hsu, C.-W. & Lin, C.-J., 2000 A Comparison on Methods for Multi-class Support Vector Machines. Journal of Artificial Societies & Social Simulation 4 (2) |
| Dumais2 | Dumais, S., Platt, J., Heckerman, D., Sahami, M., 1998, Inductive Learning Algorithms and Representations for Text Categorization. In Proceedings of the ACM-CIKM98, November 1998, pp. 148-155. |
| Morik1 | Morik, K., Brockhausen, P., and Joachims, T, 1999, Combining statistical learning with a knowledge-based approach - A case study in intensive care monitoring. In Proceedings of the International Conference on Machine Learning, pp. 268-277. |
| Vapnik1 | Vladimir N. Vapnik, Statistics for Engineering and Information Science, Springer-Verlag New York, Inc., 2000, pp. 190-91. |

APPENDIX 2

Input parameters:

```
    out = array of SVM outputs
    target = array of booleans : is the ith example a positive example?
    prior1 = number of positive examples
    prior0 = number of negative examples
Outputs:

A = slope of sigmoid
float    fitBinomialSlope(    float * out,
                              bool * target,
                              int prior1,
                              int prior0 )
{
    A = 0
    hiTarget = (prior1+1)/(prior1+2)
    loTarget = 1/(prior0+2)
    lambda = 0.001
    older = 1e300
    pp = temp array to store current estimate of probability of
    examples
    foreach elt in pp{
        elt = (prior1+1)/(prior0+prior1+2)
    }
    count = 0
    for it = 1 to 100 {
        a = 0, b = 0, c = 0, d = 0, e = 0
        // First, compute Hessian & gradient of error function
        w.r.t. A
        for i = 1 to len {
            if( target[i] != 0 )
                t = hiTarget;
            else
                t = loTarget
            d1 = pp[i] - t
            d2 = pp[i]*(1-pp[i])
            a += out[i]*out[i]*d2
            b += d2
            c += out[i]*out[i]*d2
            d += out[i]*d1
            e += d1
        }
        // if gradient is really small, stop
        if( abs(d) < 1e-9 && abs(e) < 1e-9 )
            break
        oldA = A
        err = 0
        // Loop until goodness of fit increases
        while(1) {
            det = (a+lambda)*(b+lambda)-c*c
            if( det == 0 ) {
                // if determinant of Hessian is 0, increase stabilizer
                lambda *= 10
                continue
            }
            A = oldA + ((b+lambda)*d-c*e)/det
            // Now, compute the goodness of fit
            err = 0
            for i = 1 to len {
                p = 1/(1+exp(out[i]*A)
                pp[i] = p
                // log(x) should return max(log(x),-200)
                err -= t*log(p) + (1-t)*log(1-p)
            }
```

APPENDIX 2-continued

```
        if( err < olderr*(1+1e-7)) {
            lambda *= 0.1
            break
        }
        // error did not decrease, increase stabilizer and try again
        lambda *= 10
        if( lambda >= 1e6) // something's wrong, abort
            break
        }
        diff = err-olderr
        scale = 0.5*(err+olderr+1)
        if( diff > -1e-3*scale && diff < 1e-7*scale )
            ++count
        else
            count = 0
        older = err
        if( count == 3 )
            break
    }
    return A
}
```

What is claimed is:

1. In a computer-based system, a method of training a multi-category classifier using a binary SVM algorithm, said method comprising:

storing a plurality of user-defined categories in a memory of a computer;

analyzing a plurality of training examples for each category so as to identify one or more features associated with each category;

calculating at least one feature vector for each of said examples;

transforming each of said at least one feature vectors using a first mathematical function so as to provide desired information about each of said training examples; and building a SVM classifier for each one of said plurality of categories, wherein said process of building a SVM classifier comprises:

assigning each of said examples in a first category to a first class and all other examples belonging to other categories to a second class, wherein if any one of said examples belongs to both said first category and another category, such examples are assigned to the first class only;

optimizing at least one tunable parameter of a SVM classifier for said first categories, wherein said SVM classifier is trained using said first and second classes after the at least one tunable parameter has been optimized; and optimizing a second mathematical function that converts the output of the binary SVM classifier into a probability of category membership;

calculating a solution for the SVM classifier for the first category using predetermined initial value(s) for said at least one tunable parameter; and testing said solution for said first category to determine if the solution is characterized by either over-generalization or over-memorization;

wherein the SVM classifier is used on real world data, the probability of category membership of the real world data being output to at least one of a user, another system, and another process;

wherein the test to determine whether said SVM classifier solution for said first category is characterized by either over-generalization or over-memorization is based on a difference between a harmonic mean of first and second estimated probabilities on the one hand, and an arithmetic mean of said first and second estimated probabilities on the other hand;

wherein the first estimated probability is indicative of class membership and the second estimated probability is indicative of non-class membership for training examples.

2. The method of claim 1 further comprising determining whether said first category has more than a predetermined number of training examples assigned to it, wherein if the number of training examples assigned to said first category does not exceed said predetermined number, the process of building a SVM classifier for said first category is aborted.

3. The method of claim 1 further comprising testing whether the trained SVM classifier could be optimized, wherein if said SVM classifier could not be optimized, said SVM classifier for said first category is discarded.

4. The method of claim 1 wherein said at least one tunable parameter of said SVM classifier is optimized using a method further comprising the step:

allocating a subset of the training examples assigned to said first category to a "holdout" set, wherein said subset of training examples are left out of said training steph.

5. The method of claim 1 wherein said test to determine whether said SVM classifier solution for said first category is characterized by either over-generalization or over-memorization is based on a relationship between SVM classifier scores s and −s produced by said SVM classier, the first estimated and the second estimated probability having an SVM classifier score s, as provided by probability equations q(C|s) and 1.0−q(C|−s), respectively.

6. The method of claim 4 wherein said at least one tunable parameter comprises two tunable parameters for said SVM classifier, one for a positive class, and one for a negative class.

7. The method of claim 4 wherein said SVM classifier is based on a formulation having two cost factors (one for a positive class, one for a negative class), as follows:

$$\min\left[\frac{1}{2}\sum_i\sum_j \alpha_i\alpha_j y_i y_j K(x_i, x_j) - \sum_i \alpha_i\right]$$

where:

$\alpha_i$ is a Lagrange multiplier for example $X_i$, $$y_i = \begin{cases} +1, & \text{iff } x_i \text{ is in the positive class} \\ -1, & \text{iff } x_i \text{ is in the negative class} \end{cases},$$

$\phi(x)$ is a function that maps input vectors to feature vectors, $\kappa(x_i, x_j) = \phi(x_i)\cdot\phi(x_j)$ Subject to the constraints:

$$0 \le \alpha_i \le C_+, \forall \{i \mid y_i = +1\}$$

$$0 \le \alpha_i \le C_-, \forall \{i \mid y_i = -1\}$$

$$\sum_i y_i \alpha_i = 0$$

where $C^+$ and $C^-$ are the two user definable cost factors.

8. The method of claim 4 wherein said SVM classifier is based on a formulation having two cost factors (one for a positive class, one for a negative class), as follows:

$$\min\left[\frac{1}{2}\|w\|^2 - \sum_i \alpha_i\right]$$

where:

$\alpha_1$ is a Lagrange multiplier for example $X_i$, $$y_i = \begin{cases} +1, \text{ iff } x_i \text{ is in the positive class} \\ -1, \text{ iff } x_i \text{ is in the negative class} \end{cases},$$

$\phi(x)$ is a function that maps input vectors to feature vectors, $$w = \sum_i \alpha_i y_i \Phi(x_i)$$

subject to the constraints $$0 \leq \alpha_i \leq C_+, \forall \{i \mid y_i = +1\}$$
$$0 \leq \alpha_i \leq C_-, \forall \{i \mid y_i = -1\}$$
$$\sum_i y_i \alpha_i = 0$$

where w is the weight vector perpendicular to the hyperplane, $C^+$ and $C^-$ are the two user definable cost factors.

9. The method of claim 1 wherein the following steps of the method are performed in the following order:
 a) assigning each of said examples in a first category to a first class and all other examples belonging to other categories to a second class, wherein if any one of said examples belongs to both said first category and another category, such examples are assigned to the first class only;
 b) optimizing at least one tunable parameter of a SVM classifier for said first categories, wherein said SVM classifier is trained using said first and second classes; and
 c) optimizing a second mathematical function that converts the output of the binary SVM classifier into a probability of category membership.

10. The method of claim 1 wherein said SVM classifier for said first category calculates a score s for said first category, wherein said score is optimized to fit a slope parameter in a sigmoid function that transforms SVM scores to probability estimates.

11. The method of claim 1 wherein the calibration of SVM scores is performed without using unbound support vector training examples.

12. The method of claim 1, wherein the calibration of SVM scores is performed using training examples allocated to a holdout set.

13. The method of claim 1 wherein said training examples comprise documents containing text, wherein said real world data includes documents containing text.

14. A computer-readable medium for storing instructions that when executed by a computer perform a method of training a multi-platinum category classifier using a binary SVM algorithm, the method comprising:
 storing a plurality of user-defined categories in a memory of a computer;
 analyzing a plurality of training examples for each category so as to identify one or more features associated with each category;
 calculating at least one feature vector for each of said examples;
 transforming each of said at least one feature vectors using a first mathematical function so as to provide desired information about each of said training examples; and
 building a SVM classifier for each one of said plurality of categories, wherein said process of building a SVM classifier comprises:
 assigning each of said examples in a first category to a first class and all other examples belonging to other categories to a second class, wherein if any one of said examples belongs to both said first category and another category, such examples are assigned to the first class only;
 optimizing at least one tunable parameter of a SVM classifier for said first category, wherein said SVM classifier is trained using said first and second classes after the at least one tunable parameter has been optimized; and
 optimizing a second mathematical function that converts the output of the binary SVM classifier into a probability of category membership;
 calculating a solution for the SVM classifier for the first category using predetermined initial value(s) for said at least one tunable parameter; and
 testing said solution for said first category to determine if the solution is characterized by either over-generalization or over-memorization;
 wherein the SVM classifier is used on real world data, the probability of category membership of the real world data being output to at least one of a user, another system, and another process;
 wherein the test to determine whether said SVM classifier solution for said first category is characterized by either over-generalization or over-memorization is based on a difference between a harmonic mean of first and second estimated probabilities on the one hand, and an arithmetic mean of said first and second estimated probabilities on the other hand;
 wherein the first estimated probability is indicative of class membership and the second estimated probability is indicative of non-class membership for training examples.

15. The computer-readable medium of claim 14 wherein said method further comprises determining whether said first category has more than a predetermined number of training examples assigned to it, wherein if the number of training examples assigned to said first category does not exceed said predetermined number, the process of building a SVM classifier for said first category is aborted.

16. The computer-readable medium of claim 14 wherein said method further comprises testing whether the trained SVM classifier could be optimized, wherein if said SVM classifier could not be optimized, said SVM classifier for said first category is discarded.

17. The computer-readable medium of claim 14 wherein said at least one tunable parameter of said SVM classifier is optimized using a method further comprising:

allocating a subset of the training examples assigned to said first category to a "holdout" set, wherein said subset of training examples are left out of said training step.

18. The computer-readable medium of claim 17 wherein said test to determine whether said SVM classifier solution for said first category is characterized by either over-generalization or over-memorization is based on a relationship between SVM classifier scores s and —s produced by said SVM classifier, the first estimated probability and the second estimated probability having an SVM classifier score s, as provided by probability equations q(C|s) and 1.0 −q(C|−s), respectively.

19. The computer-readable medium of claim 17 wherein said at least one tunable parameter comprises two tunable parameters for said SVM classifier, one for a positive class, and one for a negative class.

20. The computer-readable medium of claim 17 wherein said SVM classifier is based on a formulation having two cost factors (one for a positive class, one for a negative class), as follows:

$$\min\left[\frac{1}{2}\sum_i\sum_j \alpha_i\alpha_j y_i y_j K(x_i, x_j) - \sum_i \alpha_i\right]$$

where:

$\alpha_i$ is a Lagrange multiplier for example $X_i$, $$y_i = \begin{cases} +1, \text{iff } x_i \text{ is in the positive class} \\ -1, \text{iff } x_i \text{ is in the negative class} \end{cases},$$

$\phi(x)$ is a function that maps input vectors to feature vectors, $\kappa(x_i, x_j) = \phi(x_i) \cdot \phi(x_j)$ Subject to the constraints:

$$0 \leq \alpha_i \leq C_+, \forall \{i \mid y_i = +1\}$$
$$0 \leq \alpha_i \leq C_-, \forall \{i \mid y_i = -1\}$$
$$\sum_i y_i \alpha_i = 0$$

where $C^+$ and $C^-$ are the two user definable cost factors.

21. The computer readable medium of claim 17 wherein said SVM classifier is based on a formulation having two cost factors (one for a positive class, one for a negative class as follows:

$$\min\left[\frac{1}{2}\|w\|^2 - \sum_i \alpha_i\right]$$

where:

$\alpha_i$ is a Lagrange multiplier for example $X_i$, $$y_i = \begin{cases} +1, \text{iff } x_i \text{ is in the positive class} \\ -1, \text{iff } x_i \text{ is in the negative class} \end{cases},$$

$\phi(x)$ is a function that maps input vectors to feature vectors, $$w = \sum_i \alpha_i y_i \Phi(x_i)$$

subject to the constraints $$0 \leq \alpha_i \leq C_+, \forall \{i \mid y_i = +1\}$$
$$0 \leq \alpha_i \leq C_-, \forall \{i \mid y_i = -1\}$$
$$\sum_i y_i \alpha_i = 0$$

where w is the weight vector perpendicular to the hyperplane, $C^+$ and $C^-$ are the two user definable cost factors.

22. The computer-readable medium of claim 14 wherein the following steps are performed in the following order:
   a) assigning each of said examples in a first category to a first class and all other examples belonging to other categories to a second class, wherein if any one of said examples belongs to both said first category and another category such examples are assigned to the first class only;
   b) optimizing at least one tunable parameter of a SVM classifier for said first categories, wherein said SVM classifier is trained using said first and second classes; and
   c) optimizing a second mathematical function that converts the output of the binary SVM classifier into a probability of category membership.

23. The computer-readable medium of claim 14 wherein said SVM classifier for said first category calculates a scores for said first category, wherein said score is optimized to fit a slope parameter in a sigmoid function that transforms SVM scores to probability estimates.

24. The computer-readable medium of claim 23 wherein the calibration of SVM scores is performed without using unbound support vector training examples.

25. The computer-readable medium of claim 23 wherein the calibration of SVM scores is performed using training examples allocated to a holdout set.

26. The computer-readable medium of claim 14 wherein said training examples comprise documents containing text, wherein said real world data includes documents containing text.

27. In a computer-based system, a method of training a multi-category classifier using a binary SVM algorithm, said method comprising:
   storing a plurality of user-defined categories in a memory of a computer;
   analyzing a plurality of training examples for each category so as to identify one or more features associated with each category;
   calculating at least one feature vector for each of said examples;

transforming each of said at least one feature vectors using a first mathematical function so as to provide desired information about each of said training examples; and building a SVM classifier for each one of said plurality of categories;

determining whether said first category has more than a predetermined number of training examples assigned to it, wherein if the number of training examples assigned to said first category does not exceed said predetermined number, the process of building a SVM classifier for said first category is aborted;

wherein said process of building a SVM classifier comprises, in the following order:

assigning each of said examples in a first category to a first class and all other examples belonging to other categories to a second class, wherein if any one of said examples belongs to both said first category and another category, such examples are assigned to the first class only;

optimizing at least one tunable parameter of a SVM classifier for said first categories wherein said SVM classifier is trained using said first and second classes after the at least one tunable parameter has been optimized; and optimizing a second mathematical function that converts the output of the binary SVM classifier into a probability of category membership;

wherein the SVM classifier is used on documents, the probability of category membership of the documents being output to at least one of a user, another system, and another process;

wherein said at least one tunable parameter of said SVM classifier is optimized using a method comprising the steps of:

allocating a subset of the training examples assigned to said first category to a "holdout" set, wherein said subset of training examples are left out of said training step;

calculating a solution for the SVM classifier for the first category using predetermined initial value(s) for said at least one tunable parameter; and testing said solution for said first category to determine if the solution is characterized by either over-generalization or over-memorization;

wherein said test to determine whether said SVM classifier solution for said first category is characterized by either over-generalization or over-memorization is based on a relationship between SVM classifier scores s and −s produced by said SVM classifier, a first estimated probability indicative of class membership and a second estimated probability indicative of non-class membership for training examples with an SVM classifier score s, as provided by probability equations q(C|s) and 1.0−q(C|−s), respectively;

wherein the test to determine whether said SVM classifier solution for said first category is characterized by either over-generalization or over-memorization is based on a difference between a harmonic mean of said first and second estimated probabilities, on the one hand, and an arithmetic mean of said first and second estimated probabilities, on the other hand;

wherein said at least one tunable parameter comprises two tunable parameters for said SVM classifier, one for a positive class, and one for a negative class.

28. The method of claim 27 wherein said SVM classifier is based on a formulation having two cost factors (one for a positive class, one for a negative class), as follows:

$$\min\left[\frac{1}{2}\sum_i\sum_j \alpha_i\alpha_j y_i y_j K(x_i, x_j) - \sum_i \alpha_i\right]$$

where:

$\alpha_1$ is a Lagrange multiplier for example $X_i$, $$y_i = \begin{cases} +1, \text{iff } x_i \text{ is in the positive class} \\ -1, \text{iff } x_i \text{ is in the negative class} \end{cases},$$

$\phi(x)$ is a function that maps input vectors to feature vectors, $\kappa(x_i, x_j) = \phi(x_i) \cdot \phi(x_j)$ Subject to the constraints:

$$0 \leq \alpha_i \leq C_+, \forall \{i \mid y_i = +1\}$$

$$0 \leq \alpha_i \leq C_-, \forall \{i \mid y_i = -1\}$$

$$\sum_i y_i \alpha_i = 0$$

where $C^+$ and $C^-$ are the two user definable cost factors.

29. The method of claim 27 wherein said SVM classifier is based on a formulation having two cost factors (one for a positive class, one for a negative class), as follows:

$$\min\left[\frac{1}{2}\|w\|^2 - \sum_i \alpha_i\right]$$

where:

$\alpha_1$ is a Lagrange multiplier for example $X_i$, $$y_i = \begin{cases} +1, \text{iff } x_i \text{ is in the positive class} \\ -1, \text{iff } x_i \text{ is in the negative class} \end{cases},$$

$\phi(x)$ is a function that maps input vectors to feature vectors, $$w = \sum_i \alpha_i y_i \Phi(x_i)$$

subject to the constraints $$0 \leq \alpha_i \leq C_+, \forall \{i \mid y_i = +1\}$$

$$0 \leq \alpha_i \leq C_-, \forall \{i \mid y_i = -1\}$$

$$\sum_i y_i \alpha_i = 0$$

where w is the weight vector perpendicular to the hyperplane, $C^+$ and $C^-$ are the two user definable cost factors.

* * * * *

UNITED STATES PATENT AND TRADEMARK OFFICE
CERTIFICATE OF CORRECTION

PATENT NO. : 7,386,527 B2
APPLICATION NO. : 10/412163
DATED : June 10, 2008
INVENTOR(S) : Harris et al.

It is certified that error appears in the above-identified patent and that said Letters Patent is hereby corrected as shown below:

Col. 12, line 61 change "alpha.sub.1" to --alpha.sub.i--
Col. 13, line 26 change "alpha.sub.1" to --alpha.sub.i--
Col. 13, line 56 change "epsilon alpha F1" to -- ~c.sub.i F1--
Col. 13, line 59 change "epsilon alpha F1" to -- ~c.sub.i F1--.

Col. 18, line 24 change "steph." to --step.--
Col. 18, line 46 change "alpha.sub.1" to --alpha.sub.i--
Col. 19, line 11 change "alpha.sub.1" to --alpha.sub.i--
Col. 20, line 1 change "multi-platinum category" to --multi-category--
Col. 21, line 33 change "alpha.sub.1" to --alpha.sub.j--
Col. 21, line 33 change "X.sub.i" to --X.sub.j--
Col. 21, line 57 change "negative class" to --negative class),--
Col. 21, line 67 change "alpha.sub.1" to --alpha.sub.i--
Col. 24, line 10 change "alpha.sub.1" to --alpha.sub.i--
Col. 24, line 37 change "alpha.sub.1" to --alpha.sub.i--.

Signed and Sealed this

Twenty-fifth Day of November, 2008

JON W. DUDAS
*Director of the United States Patent and Trademark Office*